| (12) | United States Patent<br>Ko et al. | (10) Patent No.: US 11,563,232 B2<br>(45) Date of Patent: Jan. 24, 2023 |
|---|---|---|

(54) LAMINATION APPARATUS AND METHOD FOR SECONDARY BATTERY

(71) Applicant: LG Chem, Ltd., Seoul (KR)

(72) Inventors: Joon Sang Ko, Daejeon (KR); Kwan Bo Lee, Daejeon (KR); Jae Hong Kim, Daejeon (KR); Su Ho Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 752 days.

(21) Appl. No.: 16/476,726

(22) PCT Filed: Sep. 21, 2018

(86) PCT No.: PCT/KR2018/011306
§ 371 (c)(1),
(2) Date: Jul. 9, 2019

(87) PCT Pub. No.: WO2019/083174
PCT Pub. Date: May 2, 2019

(65) Prior Publication Data
US 2019/0363389 A1 Nov. 28, 2019

(30) Foreign Application Priority Data
Oct. 24, 2017 (KR) .................. 10-2017-0138385

(51) Int. Cl.
*H01M 10/04* (2006.01)
(52) U.S. Cl.
CPC ... *H01M 10/0404* (2013.01); *H01M 10/0468* (2013.01)

(58) Field of Classification Search
CPC .................. H01M 10/0468; H01M 10/0404
See application file for complete search history.

(56) References Cited

U.S. PATENT DOCUMENTS

| 10,014,550 B2 | 7/2018 | Jung et al. |
| 10,559,785 B2 | 2/2020 | Kim et al. |

(Continued)

FOREIGN PATENT DOCUMENTS

| CN | 1654191 A | 8/2005 |
| EP | 3 079 196 A1 | 10/2016 |

(Continued)

OTHER PUBLICATIONS

Machine translation of KR20150037089 (Original submitted with IDS) (Year: 2015).*

(Continued)

*Primary Examiner* — Scott W Dodds
(74) *Attorney, Agent, or Firm* — Birch, Stewart, Kolasch & Birch, LLP

(57) ABSTRACT

The present invention relates to a lamination apparatus for a secondary battery, which thermally bonds an electrode assembly in which electrodes and separators are alternately stacked, the lamination apparatus comprising: a transfer member to transfer the electrode assembly; a support member to support each of top and bottom surfaces of the electrode assembly transferred by the transfer member; a heating member disposed outside the support member to heat the electrode assembly supported by the support member; and a moving member to move the heating member in a direction away from the electrode assembly.

9 Claims, 6 Drawing Sheets

(56) References Cited

U.S. PATENT DOCUMENTS

| | | | |
|---|---|---|---|
| 2001/0036573 A1* | 11/2001 | Jen | H01M 50/406 |
| | | | 429/129 |
| 2002/0007552 A1 | 1/2002 | Singleton et al. | |
| 2005/0173063 A1 | 8/2005 | Hiramoto | |
| 2012/0202105 A1 | 8/2012 | Shinyashiki et al. | |
| 2014/0020239 A1 | 1/2014 | Yuhara et al. | |
| 2015/0202647 A1 | 7/2015 | Watanabe et al. | |
| 2016/0013468 A1* | 1/2016 | Ku | H01M 50/451 |
| | | | 156/60 |
| 2017/0025702 A1 | 1/2017 | Jung et al. | |
| 2018/0190951 A1 | 7/2018 | Kim et al. | |
| 2018/0316042 A1* | 11/2018 | Kuhara | H01M 10/0413 |

FOREIGN PATENT DOCUMENTS

| | | |
|---|---|---|
| JP | H1167229 A | 3/1999 |
| JP | 2000-208140 A | 7/2000 |
| JP | 2006-303266 A | 11/2006 |
| JP | 2012-221706 A | 11/2012 |
| JP | 2013-122831 A | 6/2013 |
| JP | 2014-86265 A | 5/2014 |
| KR | 10-2015-0037089 A | 4/2015 |
| KR | 10-2015-0051498 A | 5/2015 |
| KR | 10-2016-0040087 A | 4/2016 |
| KR | 10-2016-0047690 A | 5/2016 |
| KR | 10-2016-0100561 A | 8/2016 |
| KR | 10-2016-0143587 A | 12/2016 |
| KR | 10-2017-0058262 A | 5/2017 |
| KR | 10-2017-0090157 A | 8/2017 |
| WO | WO 2015/050084 A1 | 4/2015 |

OTHER PUBLICATIONS

Extended European Search Report dated Apr. 30, 2020, for European Application No. 18870526.3.

* cited by examiner

LAMINATION APPARATUS AND METHOD FOR SECONDARY BATTERY

CROSS-REFERENCES TO RELATED APPLICATIONS

This application is a U.S. national phase application, pursuant to 35 U.S.C. § 371, of PCT/KR2018/011306, filed Sep. 21, 2018, designating the United States, which claims priority to Korean Application No. 10-2017-0138385, filed Oct. 24, 2017. The entire contents of the aforementioned patent applications are incorporated herein by this reference.

TECHNICAL FIELD

The present invention relates to a lamination apparatus and method for a secondary battery, and more particularly, to a lamination apparatus and method, in which an electrode assembly and a heating member are separated from each other while a temperature of the heating member is maintained, when the lamination apparatus is stopped, to prevent the electrode assembly from being heated.

BACKGROUND ART

In general, secondary batteries are chargeable and dischargeable unlike primary batteries that are not chargeable, and the secondary batteries are widely used in electronic devices such as mobile phones, notebook computers, camcorders, and the like, or electric vehicles and the like.

Such a secondary battery comprises an electrode assembly comprising an electrode tab, an electrode lead coupled to the electrode tab, and a case that accommodates the electrode assembly in a state in which a front end of the electrode lead protrudes to the outside. The electrode assembly is provided as a radical unit in which electrodes and separators are alternately laminated or has a structure in which a plurality of radical units are laminated.

A lamination process is performed on the electrode assembly to improve bonding between the electrode and the separator. In particular, a lamination apparatus is used for the lamination process.

In other words, the lamination apparatus comprises a transfer part that transfers the electrode assembly in which the electrodes and the separators are alternately stacked, a heating part that heats the transferred electrode assembly, and a pressing part that press-rolls the heated electrode assembly to improve adhesion.

However, the lamination apparatus has a problem that, when the transfer part is stopped, the heating part continuously heats one electrode assembly to deform the electrode assembly, thereby causing defects of products.

To prevent this problem, in the lamination apparatus, when the transfer part is stopped, power supplied to the heating part is interrupted, and thus, the temperature of the heating part is decreased to prevent the electrode assembly from being heated by the heating part, thereby preventing the electrode assembly from being deformed and also prevent defects of products from occurring.

However, the lamination apparatus has a problem that, when the transfer part is restarted, a long time is required to normalize a temperature of the heating part, thereby significantly reducing efficiency and continuity of an operation.

DISCLOSURE OF THE INVENTION

Technical Problem

The present invention has been made to solve the above problems, an object of the present invention is to provide a lamination apparatus for a secondary battery, in which, when a transfer part provided in the lamination apparatus is stopped, a heating member that heats an electrode assembly is moved to separate the electrode assembly from the heating member, thereby preventing the electrode assembly from being heated by the heating member and also preventing deformation and defects of the electrode assembly from occurring. Particularly, an object of the present invention is to provide a lamination apparatus for a secondary battery, in which, when the transfer member is restarted, the electrode assembly is capable of being immediately reheated without a waiting time.

Technical Solution

A lamination apparatus for a secondary battery according to an embodiment of the present invention, which thermally bonds an electrode assembly in which electrodes and separators are alternately stacked, may comprise: a transfer member to transfer the electrode assembly; a support member to support each of top and bottom surfaces of the electrode assembly transferred by the transfer member; a heating member disposed outside the support member to heat the electrode assembly supported by the support member; and a moving member to move the heating member in a direction away from the electrode assembly.

The moving member may move the heating member in the direction away from the electrode assembly to prevent the electrode assembly from being heated by the heating member when the transfer member is stopped.

The moving member may allow the heating member to return to a previous position thereof to reheat the electrode assembly when the transfer member is restarted.

The heating member may maintain heat capacity when the heating member is moved by the moving member.

The support member may support each of the top and bottom surfaces of the electrode assembly to prevent the electrode assembly from being tilted when the heating member is moved.

The support member may comprise a metal plate having thermal conductivity.

The support member may further comprise a heat-resistant plate disposed on an inner surface of the metal plate on which the electrode assembly is supported.

The support member may comprise a heat-resistant plate that supports the electrode assembly and a metal plate disposed on an outer edge of the heat-resistant plate, by which the electrode assembly is not supported, to increase a stiffness of the heat-resistant plate.

A lamination method for a secondary battery according to an embodiment of the present invention may comprise: a transfer step (S10) of transferring an electrode assembly by a transfer member; a support step (S20) of supporting each of top and bottom surfaces of the electrode assembly transferred by the transfer member with a support member; a heating step (S30) of heating the electrode assembly supported by the support member with a heating member provided outside the support member; and a bonding step (S40) of press-rolling and bonding the electrode assembly heated by the heating member through a rolling member.

The lamination method may further comprise a non-heating process (S35), in which the heating member is moved in a direction away from the electrode assembly by a moving member to prevent the electrode assembly from being heated by the heating member when the transfer member is stopped, between the heating step (S30) and the bonding step (S40).

The lamination method may further comprise a reheating process (S37), in which the heating member returns to a previous position thereof to reheat the electrode assembly supported by the support member with the heating member when the transfer member is restarted, between the non-heating process (S35) and the bonding step (S40).

Advantageous Effects

First, the lamination apparatus for the secondary battery may comprise the transfer member, the support member, the heating member, and the moving member. Thus, the heating member and the electrode assembly may be separated from each other to prevent the electrode assembly from being heated by the heating member, thereby preventing the deformation and the defects of the electrode assembly from occurring.

Second, the moving member of the lamination apparatus for the secondary battery may move the heating member in the direction away from the electrode assembly to prevent the heat capacity of the heating member from being transferred to the electrode assembly when the transfer member is stopped, thereby preventing the deformation and the defects of the electrode assembly from occurring.

Third, the moving member of the lamination apparatus for the secondary battery may allow the heating member to be moved to its previous position to be close to the electrode assembly. Therefore, the electrode assembly may be reheated, thereby improving the efficiency of the operation.

Fourth, the heating member of the lamination apparatus for the secondary battery may maintain the heat capacity even through the heating member is moved by the moving member. Therefore, the heating member may reheat the electrode assembly without the waiting time, thereby improving the continuity of the operation.

Fifth, the support member of the lamination apparatus for the secondary battery may support each of both side surfaces of the electrode assembly even though the heating member is moved. Therefore, the tilting of the electrode provided in the electrode assembly may be prevented, and the defects of the electrode assembly may be prevented from occurring.

Sixth, the support member of the lamination apparatus for the secondary battery may comprise the metal plate having thermal conductivity to transfer the heat source transferred from the heating member to the electrode assembly as is, thereby heating the electrode assembly.

Seventh, the support member of the lamination apparatus for the secondary battery may further comprise the heat-resistant plate on the inner surface of the metal plate. Particularly, the heat-resistant plate may be applied or attached in the form of the film to the metal plate. Therefore, the top and bottom surfaces of the electrode assembly supported by the support member may be prevented from being damaged, and as a result, the defects of the electrode assembly may be significantly prevented from occurring.

MODE FOR CARRYING OUT THE INVENTION

Figure 1:
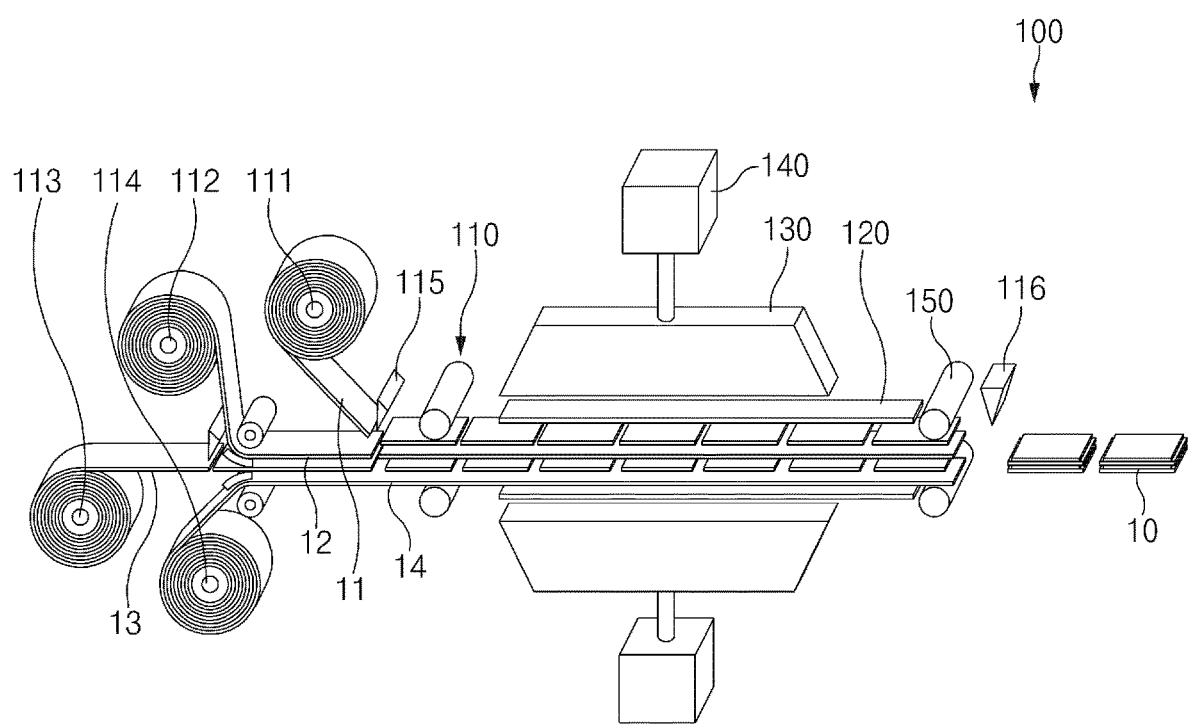
FIG. 1 is a schematic perspective view of a lamination apparatus according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, elements unnecessary for describing the present invention will be omitted for clarity, and also like reference numerals in the drawings denote like elements.

Lamination Apparatus According to First Embodiment of the Present Invention

As illustrated in FIG. 1, a lamination apparatus according to a first embodiment of the present invention is configured to thermally bond an electrode assembly in which electrodes and separators are alternately stacked. The lamination apparatus comprises a transfer member 110 to transfer the electrode assembly 10, a support member 120 to support each of the outermost top and bottom surfaces of the electrode assembly 10 transferred by the transfer member 110, a heating member 130 to heat the electrode assembly 10 supported by the support member 120, and a moving member 140 to move the heating member in a direction away from the electrode assembly 10.

The transfer member 110 transfers the electrode assembly 10, in which the electrodes and the separators are alternately stacked, to a rolling member 150 via the heating member 130. For example, the transfer member 110 is provided as a transfer roller or a conveyor belt to transfer the electrode assembly at a predetermined time and interval.

The transfer member 110 further comprises an electrode transfer part and a separator transfer part, which respectively transfer the electrodes and the separators. The electrode transfer part comprises a first electrode transfer part 111 that transfers a first electrode 11 and a second electrode transfer part 113 that transfers a second electrode 13. The separator transfer part comprises a first separator transfer part 112 that transfers a first separator 12 and a second separator transfer part 114 that transfers a second separator 14.

As described above, the transfer member 110 may sequentially laminate the first electrode 11, the first separator 12, the second electrode 13, and the second separator 14, which are transferred through the electrode transfer part and the separator transfer part, to manufacture the electrode assembly 10. The manufactured electrode assembly 10 is transferred to the rolling member 150 via the heating member 130.

The transfer member 110 further comprises a first cutter 115 that cuts each of the first electrode 11 transferred by the first electrode transfer part 111 and the second electrode 13 transferred by the second electrode transfer part 113 into a predetermined size.

In addition, the transfer member 110 further comprises a second cutter 116 that cuts the electrode assembly 10, which is bonded through the rolling member 150, into a predetermined size. The second cutter 116 cuts the separator between the electrodes corresponding to each other, which are provided in the bonded electrode assembly 10, to obtain an electrode assembly 10 having a predetermined size.

The support member 120 is configured to support the electrode assembly transferred by the transfer member 110. The support member 120 has a rectangular plate shape and supports each of the outermost top and bottom surfaces of the electrode assembly 10. In particular, the support member 120 may press the electrode assembly 10 within a range in which the transferring of the electrode assembly 10 by the transfer member 110 is not interfered. Thus, the electrode assembly 10 transferred by the transfer member 110 may be significantly prevented from being tilted.

Figure 4:
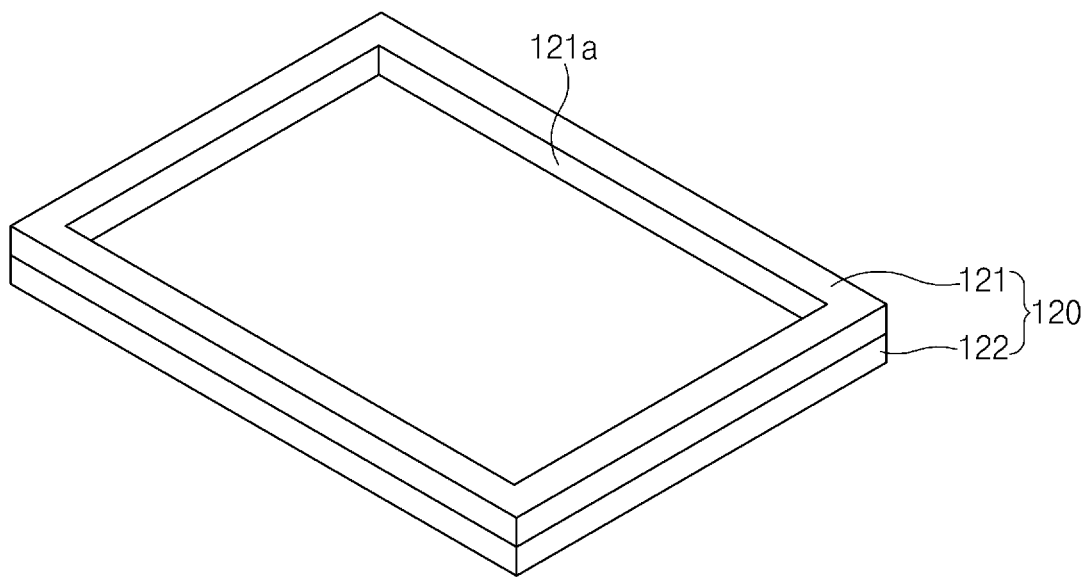
FIG. 4 is a perspective view illustrating the support member of the lamination apparatus according to the first embodiment of the present invention.

As illustrated in FIG. 4, the support member 120 may comprise a metal plate 121 having thermal conductivity. Thus, the support member 120 may transfer heat capacity transferred by the heating member 130 to the electrode assembly 10 as is to effectively heat the electrode assembly 10. In other words, even though the support member 120 is disposed between the electrode assembly 10 and the heating member 130, the electrode assembly 100 may be stably heated.

The metal plate 121 may have a thickness of 2 mm to 10 mm, and more particularly, a thickness of 3 mm to 5 mm. When the metal plate 121 has a thickness of 2 mm or less, although heat of the heating member 130 may be reliably transferred to the electrode assembly 10 without loss of heat capacity, the metal plate 121 may be easily bent. When the metal plate 121 has a thickness of 10 mm or more, although the bending of the metal plate 121 is solved, the loss of the heat capacity may occur, and accordingly, it is difficult to stably heat the electrode assembly 10.

In addition, the metal plate 121 may have an opening groove 121*a* in an outer surface thereof, which does not face the electrode assembly 10. Thus, the thickness of the metal plate 121, where it supports the electrode assembly 10, may be decreased due to the opening groove 121*a*, and the heat may be transferred to the electrode assembly 10 without a loss. An edge of the metal plate 121, where the electrode assembly 10 is not supported thereby, may have an increased thickness to prevent the metal plate 121 from being deformed.

The metal plate 121 may have a rectangular frame shape. Thus, the metal plate 121 may stably support the electrode assembly 10 and also stably heat the electrode assembly 10 because the heat capacity of the heating member is transferred as is to the electrode assembly 10.

The support member 120 may further comprise a heat-resistant plate 122 on an inner surface of the metal plate, on which the electrode assembly 10 is supported. The electrode assembly 10 may be supported on the heat-resistant plate 122 to prevent the electrode assembly from being damaged. Particularly, the heat-resistant plate 122 may be provided in the form of a film, and thus, be applied or attached to the inner surface of the metal plate 121 to improve convenience and efficiency of usage.

The support member 120 may have an area greater than an area of the electrode assembly 10. Thus, the support member 120 may stably support the entire top or bottom surface of the electrode assembly 10.

The heating member 130 may be disposed outside the support member 120 to heat the electrode assembly 10 supported by the support member 120. In particular, the heating member 130 may be closely attached to the outside of the support member 120. Thus, the heat capacity of the heating member 130 may be more stably transferred to the electrode assembly 10.

The heating member 130 may be a heating device that generates heat by power supplied from the outside.

The moving member 140 may be configured to separate the electrode assembly from the heating member to prevent the heat source of the heating member from being transferred to the electrode assembly 10. The moving member 140 moves the heating member 130 in a direction away from the electrode assembly 10 supported by the support member 120. In other words, referring to FIGS. 2 and 3, the moving member 140 may move the heating member 130 in an upward or downward direction that is away from the electrode assembly 10. Thus, the moving member 140 may block or minimize the transferring of the heat source of the heating member 130 into the electrode assembly 10 to prevent the electrode assembly 10 from being heated by the heating member 130.

Figure 2:
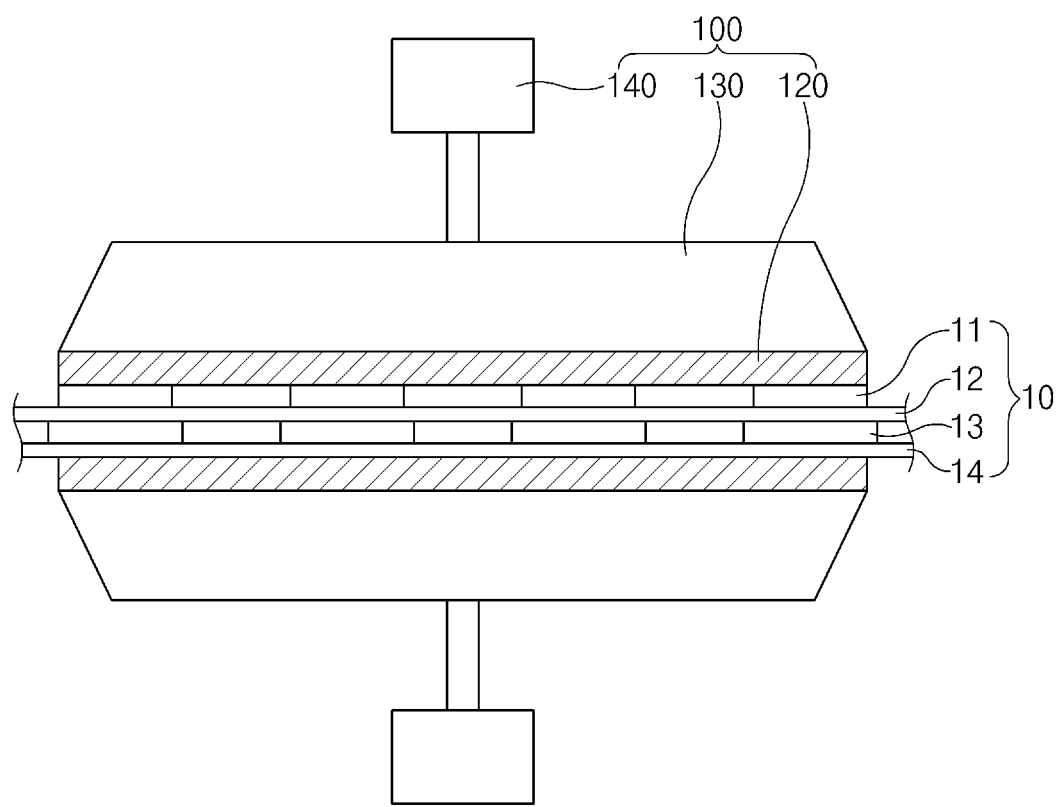
FIG. 2 is a side view of a support member, a heating member, and a moving member when the lamination apparatus operates according to the first embodiment of the present invention.

In other words, as illustrated in FIG. 2, the moving member 140 allows the heating member 130 to be closely attached to the outside of the support member 120 when the transfer member 110 operates to allow the heating member 130 to stably heat the electrode assembly 10 supported by the support member 120.

Figure 3:
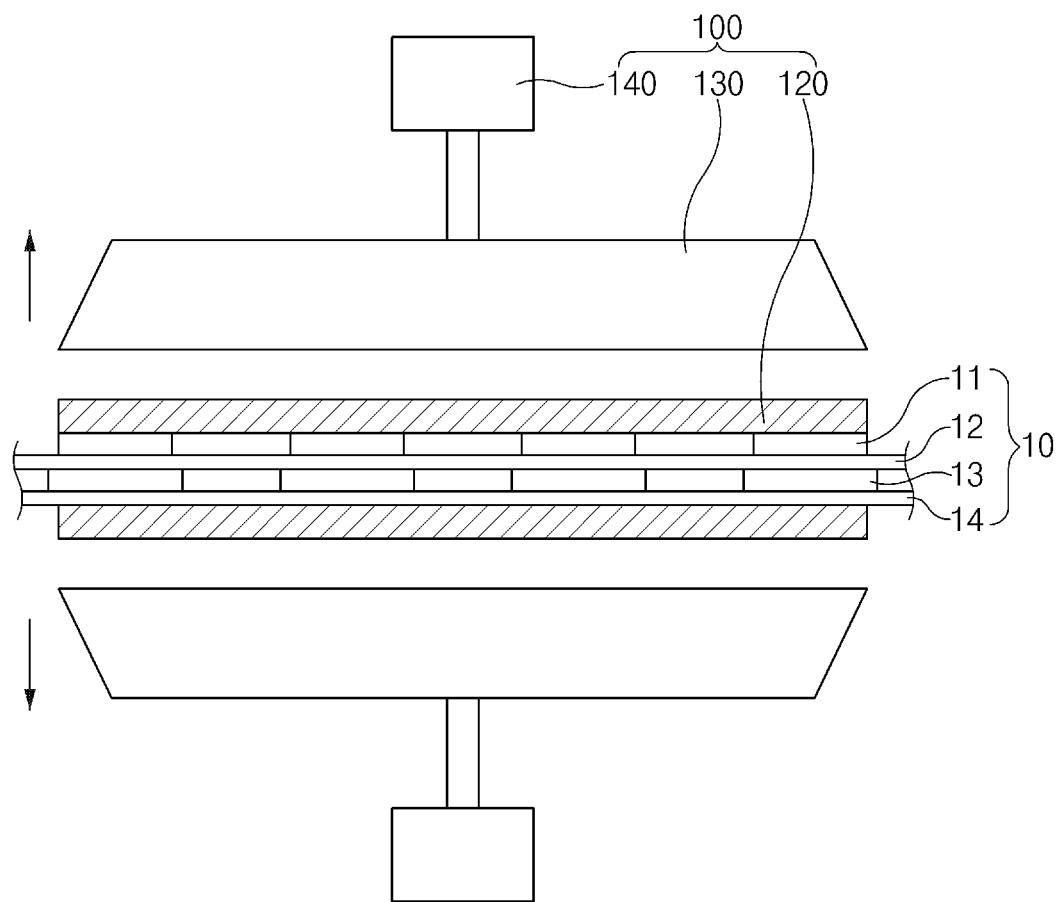
FIG. 3 is a side view of the support member, the heating member, and the moving member when the lamination apparatus is stopped according to the first embodiment of the present invention.

As illustrated in FIG. 3, the moving member 140 moves the heating member 130 in the direction that is away from the electrode assembly 10 to prevent the electrode assembly 10 from being heated by the heating member 130 when the transfer member 110 is stopped, thereby preventing deformation and defects of the electrode assembly 10 from occurring.

Accordingly, although the heat source of the heating member is maintained as is, the electrode assembly may be prevented from being heated by the heating member 130.

Further, the support member 120 may support the electrode assembly 10 even though the heating member 130 is moved. Thus, the electrode provided in the electrode assembly 10 may be prevented from being tilted between the separators.

Thereafter, when the transfer member 110 is restarted, the moving member 140 may allow the heating member 130 to return to its previous position. Thus, the electrode assembly 10 may be reheated without a waiting time, thereby improving continuity and efficiency of the operation.

The rolling member 150 may be provided in a pair to press-roll the top and bottom surfaces of the electrode assembly 10 that is heated by the heating member 130. Thus, the electrode and the separator, which are provided in the electrode assembly 10, may be bonded to each other to improve bonding therebetween.

Thus, the lamination apparatus according to the first embodiment of the present invention is characterized in that when the transfer member 110 is stopped, the heating member 130 is moved in the direction away from the electrode assembly 10 by the moving member 140. Thus, the electrode assembly 10 may be prevented from being heated by the heating member 130 to prevent the deformation and the defects of the electrode assembly from occurring. Particularly, the heat capacity of the heating member may be maintained. Thus, when the transfer member is restarted, and the heating member is disposed at its previous position by the moving member 140, the electrode assembly may be reheated without an additional waiting time, which improves the continuity and efficiency of the operation.

Hereinafter, a lamination method using the lamination apparatus according to the first embodiment of the present invention will be described.

Lamination Method According to First Embodiment of the Present Invention

Figure 5:
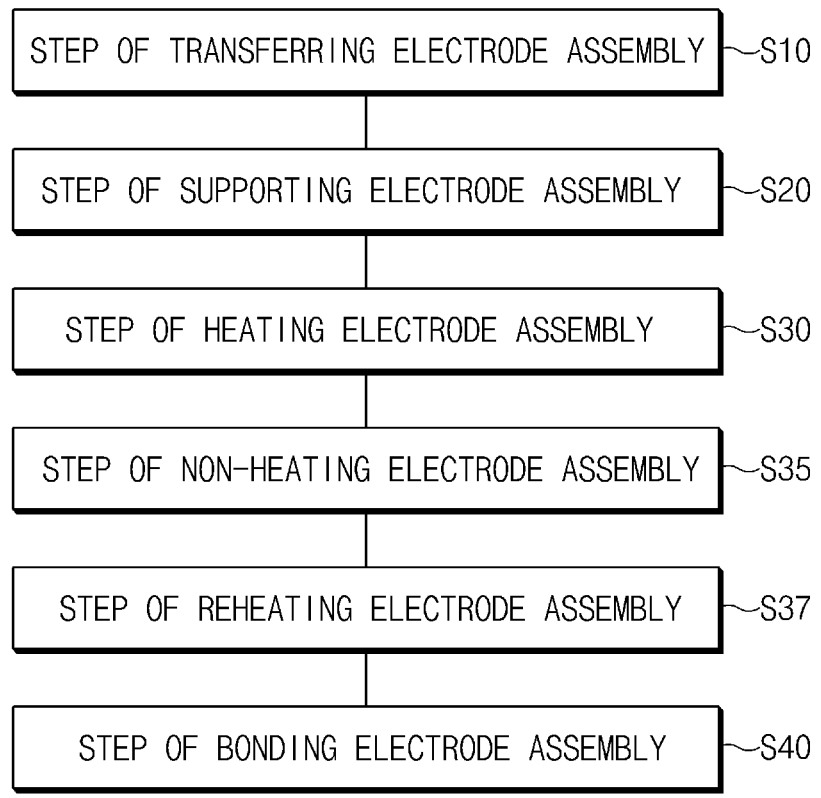
FIG. 5 is a flowchart illustrating a lamination method according to the first embodiment of the present invention.

As illustrated in FIG. 5, a lamination method according to the first embodiment of the present invention comprises a transfer step (S10) of transferring an electrode assembly 10 through a transfer member 110, a support step (S20) of supporting each of top and bottom surfaces of the electrode assembly 10 transferred by the transfer member 110, a heating step (S30) of heating the electrode assembly 10 supported by the support member 120 with a heating member 130 provided outside the support member, and a bonding step (S40) of rolling and bonding the electrode assembly 10 heated by the heating member 130 through a rolling member 150.

In the transfer step (S10), the electrode assembly 10 is transferred to the rolling member 150 via the heating member 130 by the transfer member 110. The transfer member 110 further comprises an electrode transfer part and a separator transfer part, which respectively transfer electrodes and separators to allow the electrodes and the separators to be alternately stacked. The electrode transfer part comprises a first electrode transfer part 111 that transfers a first electrode 11 and a second electrode transfer part 113 that transfers a second electrode 13. The separator transfer part comprises a first separator transfer part 112 that transfers a first separator 12 and a second separator transfer part 114 that transfers a second separator 14.

Accordingly, in the transfer step, the first electrode 11, the first separator 12, the second electrode 13, and the second separator 14 may be transferred to be sequentially stacked to manufacture the electrode assembly 10, and the manufactured electrode assembly 10 is transferred to the rolling member 150 via the heating member 130.

In the transfer step (S10), a first cutter 115 for cutting each of the first electrode 11 and the second electrode 13, which are transferred, into a predetermined size is used. The first electrode 11 and the second electrode 13, each of which is cut into the predetermined size by the first cutter 115, are alternately stacked together with the first separator 12 and the second separator 14 to manufacture the electrode assembly 10.

In the support step (S20), each of the outermost top and bottom surfaces of the electrode assembly 10 that is transferred in the transfer step (S10) is supported by the support member 120 to prevent the electrode assembly 10 from being tilted.

In the heating step (S30), the electrode assembly 10 supported by the support member 120 is heated to increase the temperature through the heating member 130 provided outside the support member 120.

The bonding step (S40), the electrode assembly 10 heated by the heating member 130 is press-rolled by the rolling member 150 to improve bonding between the electrode and the separator, which are provided in the electrode assembly 10.

Further, in the bonding step (S40), a second cutter 116 for cutting the bonded electrode assembly 10 in a predetermined size is provided. The second cutter 116 cuts each of the first separator 12 and the second separator 14, which are disposed between the electrodes corresponding to each other, to manufacture the electrode assembly having a predetermined size.

In particular, as illustrated in FIGS. 3 and 4, a non-heating process (S35) in which the heating member 130 is moved in a direction away from the electrode assembly by a moving member 140, when the transfer member 110 is stopped, to prevent the electrode assembly 10 from being heated by the heating member 130 may be further performed between the heating step (S30) and the bonding step (S40).

In other words, the non-heating process (S35) is performed to prevent one electrode assembly 10 from being continuously heated by the heating member 130 when the transfer member 120 is stopped. The heating member 130 may be moved in the direction away from the electrode assembly 10, supported by the support member 120, by the moving member 140, and thus, even though heat capacity of the heating member is maintained, a heat source of the heating member 130 may be effectively prevented from being transferred to the electrode assembly 10 to prevent deformation and defects of the electrode assembly 10 from occurring.

Even though the heating member 130 is moved, the support member 120 may support the electrode assembly to prevent the first electrode 11 and the second electrode 13, which are provided in the electrode assembly 10, from being tilted.

Particularly, the support member 120 may transfer the heat capacity transferred from the heating member 130 to the electrode assembly 10 as is through a metal plate 121 having thermal conductivity. Thus, the electrode assembly 10 may be stably heated.

In addition, the support member 120 may prevent the electrode assembly 10 from being damaged, due to a heat-resistant plate 122 disposed on an inner surface of the metal plate 121.

As illustrated in FIG. 2, a reheating process (S37) in which the heating member 130 returns to its previous position when the transfer member 110 is restarted to reheat the electrode assembly 10, supported by the support member 120, by the heating member 130 is further performed between the non-heating process (S35) and the bonding step (S40).

In the reheating process (S37), when the transfer member 110 is restarted to transfer the electrode assembly 10, the heating member 130 is returned to its previous position by the moving member 140. In particular, since the heat capacity of the heating member 130 is maintained, the electrode assembly 10 being transferred may be reheated without an additional waiting time to improve continuity and efficiency of an operation.

Hereinafter, in descriptions of another embodiment of the present invention, constituents having the same configuration and function as the abovementioned embodiment have been given the same reference numeral in the drawings, and thus duplicated description will be omitted.

Lamination Apparatus According to Second Embodiment of the Present Invention

Figure 6:
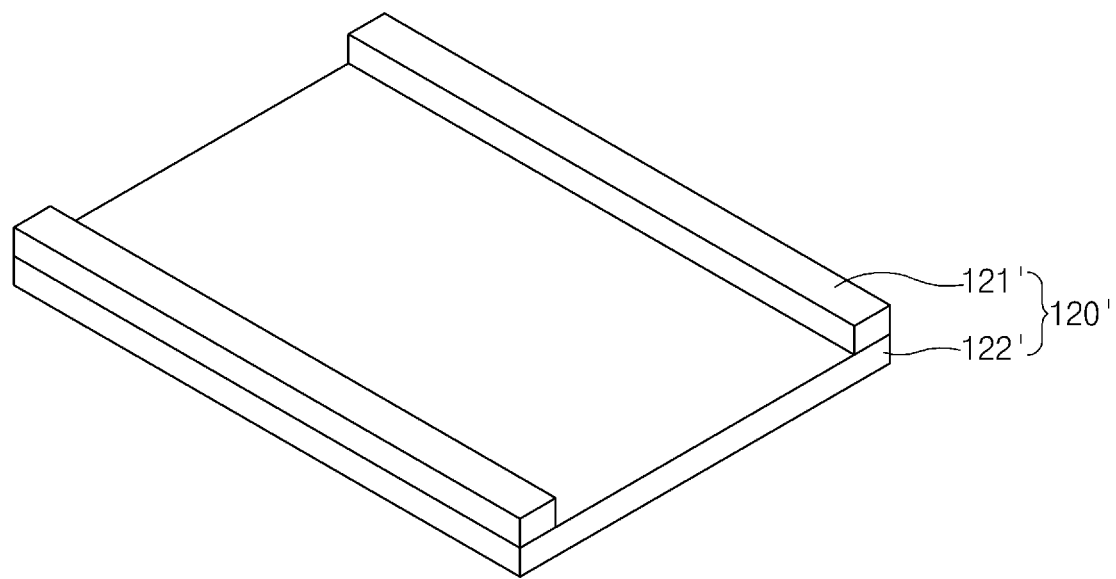
FIG. 6 is a perspective view illustrating a support member of a lamination apparatus according to a second embodiment of the present invention.

As illustrated in FIG. 6, a lamination apparatus according to a second embodiment of the present invention comprises a support member 120'. The support member 120' comprises a heat-resistant plate 122' that supports the electrode assembly and a metal plate 121' that is disposed on an outer edge of the heat-resistant plate 122', by which the electrode assembly 10 is not supported, and which allows the stiffness of the heat-resistant plate 122' to be increased.

In other words, the support member 120' comprises the metal plate 120' on only the edge of the outer surface of the heat-resistant plate 122'. Further, the support member 120' may be provided on only two sides that face each other of the heat-resistant plate 122'. Thus, the heat-resistant plate 122' may increase in stiffness, and the heat capacity transferred by the heating member 130 may be effectively transferred to the electrode assembly 10 without a loss of the heat capacity, thereby stably heating the electrode assembly 10.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A lamination apparatus for a secondary battery, the lamination assembly configured to thermally bond an electrode assembly in which electrodes and separators are alternately stacked, the lamination apparatus comprising:
    a transfer member comprising an electrode transfer part and a separator transfer part and configured to transfer the electrode assembly;
    a support member comprising opposing plates and configured to support each of top and bottom surfaces of the electrode assembly transferred by the transfer member; and
    a heating member comprising opposing heaters disposed outside the support member and configured to heat the electrode assembly supported by the support member and to be moved in away from the electrode assembly,
    wherein the opposing plates each include a metal plate having thermal conductivity, and
    wherein the metal plate has an opening groove in an outer surface thereof, which does not face the electrode assembly.

2. The lamination apparatus of claim 1, wherein the heaters are configured to move away from the electrode assembly to prevent the electrode assembly from being heated by the heating member when the transfer member is stopped.

3. The lamination apparatus of claim 2, wherein the heaters are configured to return to a previous position thereof to reheat the electrode assembly when the transfer member is restarted.

4. The lamination apparatus of claim 1, wherein the heaters maintain heat capacity when moved.

5. The lamination apparatus of claim 1, wherein the support member supports the each of top and bottom surfaces of the electrode assembly to prevent the electrode assembly from being tilted when the heating member is moved.

6. The lamination apparatus of claim 1, wherein the opposing plates each further comprise a heat-resistant plate disposed on an inner surface of the metal plate, the heat-resistant plates configured to support the electrode assembly.

7. The lamination apparatus of claim 6, wherein the metal plates are disposed on an outer edge of the heat-resistant plates to increase a stiffness of the heat-resistant plates.

8. The lamination apparatus of claim 1, wherein the metal plate has a frame shape with opposite frame parts arranged parallel to each other.

9. The lamination apparatus of claim 1, wherein the opening groove creates a reduced thickness in the metal plate in a region where the metal plate is configured to support the electrode assembly.

\* \* \* \* \*